US011153319B2

(12) United States Patent
Barbara et al.

(10) Patent No.: US 11,153,319 B2
(45) Date of Patent: Oct. 19, 2021

(54) FLEXIBLE IMPLEMENTATION OF USER LIFECYCLE EVENTS FOR APPLICATIONS OF AN ENTERPRISE

(71) Applicant: Okta, Inc., San Francisco, CA (US)

(72) Inventors: Christopher Barbara, San Francisco, CA (US); RaghuRam Pamidimarri, Union City, CA (US)

(73) Assignee: Okta, Inc., San Francisco, CA (US)

( * ) Notice: Subject to any disclaimer, the term of this patent is extended or adjusted under 35 U.S.C. 154(b) by 597 days.

(21) Appl. No.: 14/919,500

(22) Filed: Oct. 21, 2015

(65) Prior Publication Data

US 2017/0118220 A1   Apr. 27, 2017

(51) Int. Cl.
*H04L 29/06*   (2006.01)
*G06F 21/60*   (2013.01)
*G06Q 10/10*   (2012.01)
*H04L 12/24*   (2006.01)

(52) U.S. Cl.
CPC .......... *H04L 63/102* (2013.01); *G06F 21/604* (2013.01); *G06Q 10/10* (2013.01); *H04L 63/101* (2013.01); *H04L 41/5041* (2013.01)

(58) Field of Classification Search
CPC .................................................... H04L 63/102
USPC ............................................................ 726/4
See application file for complete search history.

(56) References Cited

U.S. PATENT DOCUMENTS 5,748,890 A * 5/1998 Goldberg ............ G06F 21/6218
726/2
7,076,504 B1 * 7/2006 Handel ................... G06Q 30/02
705/14.39
7,134,137 B2 * 11/2006 Joshi ................. G06F 17/30867
707/E17.109

(Continued)

FOREIGN PATENT DOCUMENTS

JP   2001-134432 A   5/2001
KR   10-2005-0026624 A   3/2005

OTHER PUBLICATIONS

PCT International Search Report and Written Opinion for PCT/US2016/035938, dated Sep. 19, 2016, 7 Pages.

(Continued)

*Primary Examiner* — Samson B Lemma
*Assistant Examiner* — Abdullah Almamun
(74) *Attorney, Agent, or Firm* — Fenwick & West LLP (57) ABSTRACT

Users of organizations use many different third-party applications. The organizations use the services of a server to manage and interact with the third-party applications. In particular, the server provides a user lifecycle API that defines a set of user lifecycle events corresponding to changes of the users with respect to their organizations and/or the third-party applications that they use within the organizations. The server further has access to lifecycle code modules corresponding to the different third-party applications and defining how those third-party applications will respond to the user lifecycle events. When a user lifecycle event occurs for a particular user of a particular organiza- (Continued)

tion, the server determines the third-party applications to which the organization has given the user access uses the appropriate functionality of the lifecycle code modules of the corresponding third-party applications to implement the appropriate user changes for those applications.

20 Claims, 4 Drawing Sheets

(56) References Cited

U.S. PATENT DOCUMENTS

| | | | | |
|---|---|---|---|---|
| 7,266,595 | B1* | 9/2007 | Black | H04L 41/0806 709/223 |
| 7,509,672 | B1* | 3/2009 | Horwitz | G06F 21/41 726/8 |
| 7,571,447 | B2* | 8/2009 | Ally | H04L 67/02 719/313 |
| 8,281,014 | B2* | 10/2012 | Stanev | H04L 67/142 709/227 |
| 8,667,024 | B2* | 3/2014 | Anand | G06F 17/30575 707/792 |
| 8,707,262 | B2* | 4/2014 | Eska | G06Q 10/06 717/120 |
| 9,477,737 | B1* | 10/2016 | Charyk | G06F 17/30575 |
| 2001/0007128 | A1* | 7/2001 | Lambert | G06F 21/335 713/165 |
| 2002/0059142 | A1* | 5/2002 | Krause | G06Q 10/10 705/44 |
| 2005/0240580 | A1* | 10/2005 | Zamir | G06F 17/30867 |
| 2006/0218394 | A1 | 9/2006 | Yang | |
| 2007/0043956 | A1* | 2/2007 | El Far | G06F 11/3664 713/189 |
| 2007/0233600 | A1 | 10/2007 | McMahon | |
| 2009/0063494 | A1 | 3/2009 | Amies et al. | |
| 2009/0157470 | A1* | 6/2009 | Rathbun | G06Q 10/0631 705/7.12 |
| 2012/0150577 | A1* | 6/2012 | Berg | G06Q 10/0631 705/7.12 |
| 2012/0239699 | A1* | 9/2012 | Anand | G06F 16/27 707/792 |
| 2014/0096220 | A1* | 4/2014 | Da Cruz Pinto | G06F 21/00 726/9 |
| 2015/0379101 | A1* | 12/2015 | Dowlatkhah | G06F 17/30575 707/624 |
| 2016/0048835 | A1* | 2/2016 | Mutha | G06Q 20/325 705/44 |
| 2016/0234533 | A1* | 8/2016 | Soares | H04N 21/23617 |
| 2016/0330138 | A1* | 11/2016 | Thomason | H04L 67/10 |
| 2017/0013052 | A1* | 1/2017 | Bouw | G06F 9/5061 |

OTHER PUBLICATIONS

Docker, "What is Docker?" Webpage for Docker, 2016, 8 pages, [online] [retrieved on Mar. 9, 2016] Retrieved from the internet <URL:https://www.docker.com/whatisdocker>.

* cited by examiner

FLEXIBLE IMPLEMENTATION OF USER LIFECYCLE EVENTS FOR APPLICATIONS OF AN ENTERPRISE

FIELD OF ART

The present invention generally relates to the field of software applications, and more specifically, to permitting flexible handling of user lifecycle events across an arbitrary set of third-party applications.

BACKGROUND

Many organizations, such as businesses or other enterprises, provide their users (e.g., employees) with access to a variety of software applications, such as e-mail applications, chat applications, payroll applications, timekeeping applications, and the like. The various users of the organizations have associated "user lifecycle events" that arise during their time with the organization that indicate changes of their status with respect to the organization and their abilities to use organizational resources, such as the applications available to users of the organization. For example, user lifecycle events could include a user joining the organization, a change to the user's group affiliation(s) within the organization, the user leaving the organization, and the like.

The changes indicated by the user lifecycle events typically entail changes to the user's access to organization resources, such as applications. For example, when a user joins the organization, the user may be granted access to use a core set of applications; when the user is added to a new group within the organization, the user may be granted access to an additional set of applications that are specific to that group; when the user's name changes, the name change should be reflected in the various applications to which the user has access; and when the user leaves the organization, the user may have access to all the applications revoked.

However, the various applications typically operate in different manners, particularly when they are third-party applications designed by different third parties. For example, the different applications may have different application programming interfaces (APIs) or user interfaces (UIs) for changing the name of a user. Accordingly, there is no uniform way to implement changes to a user's status within the organization across all the applications to which the user has access. Instead, administrators or other privileged users within the organization are typically burdened with the necessity of manually making the changes to all of the user's application accounts. This is time-consuming, requiring more administrator effort (and possibly the hiring of more administrators), and error-prone, possibly leading to security risks due to forgotten or delayed changes (e.g., removing an employee's application rights after the user is terminated).

SUMMARY

In one embodiment, a computer-implemented method of a server comprises storing a plurality of lifecycle code modules corresponding to a plurality of third-party applications, the lifecycle code modules implementing user lifecycle functions defined by a user lifecycle application programming interface (API) for the plurality of third-party applications; identifying an occurrence of a user lifecycle event; identifying a first user of and an organization associated with the user lifecycle event; mapping the user lifecycle event to a function of the user lifecycle API associated with the user lifecycle event; identifying, as a subset of the third-party applications, third-party applications to which the organization has granted the first user access; and for each third-party application of a plurality of the third-party applications of the identified subset, identifying a lifecycle code module corresponding to the third-party application, and calling a function of the identified lifecycle code module, thereby making a change to data of the user in the third-party application.

In one embodiment, a computer-implemented method of a server comprises accessing a plurality of lifecycle code modules corresponding to a plurality of third-party applications, the lifecycle code modules implementing user lifecycle functions defined by a user lifecycle application programming interface (API) for the plurality of third-party applications; identifying an occurrence of a user lifecycle event associated with a first user and an organization; mapping the user lifecycle event to a function of the user lifecycle API associated with the user lifecycle event; and for each third-party application of a plurality of the third-party applications, identifying a lifecycle code module corresponding to the third-party application, and calling a function of the identified lifecycle code module, thereby making a change to data of the user in the third-party application.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
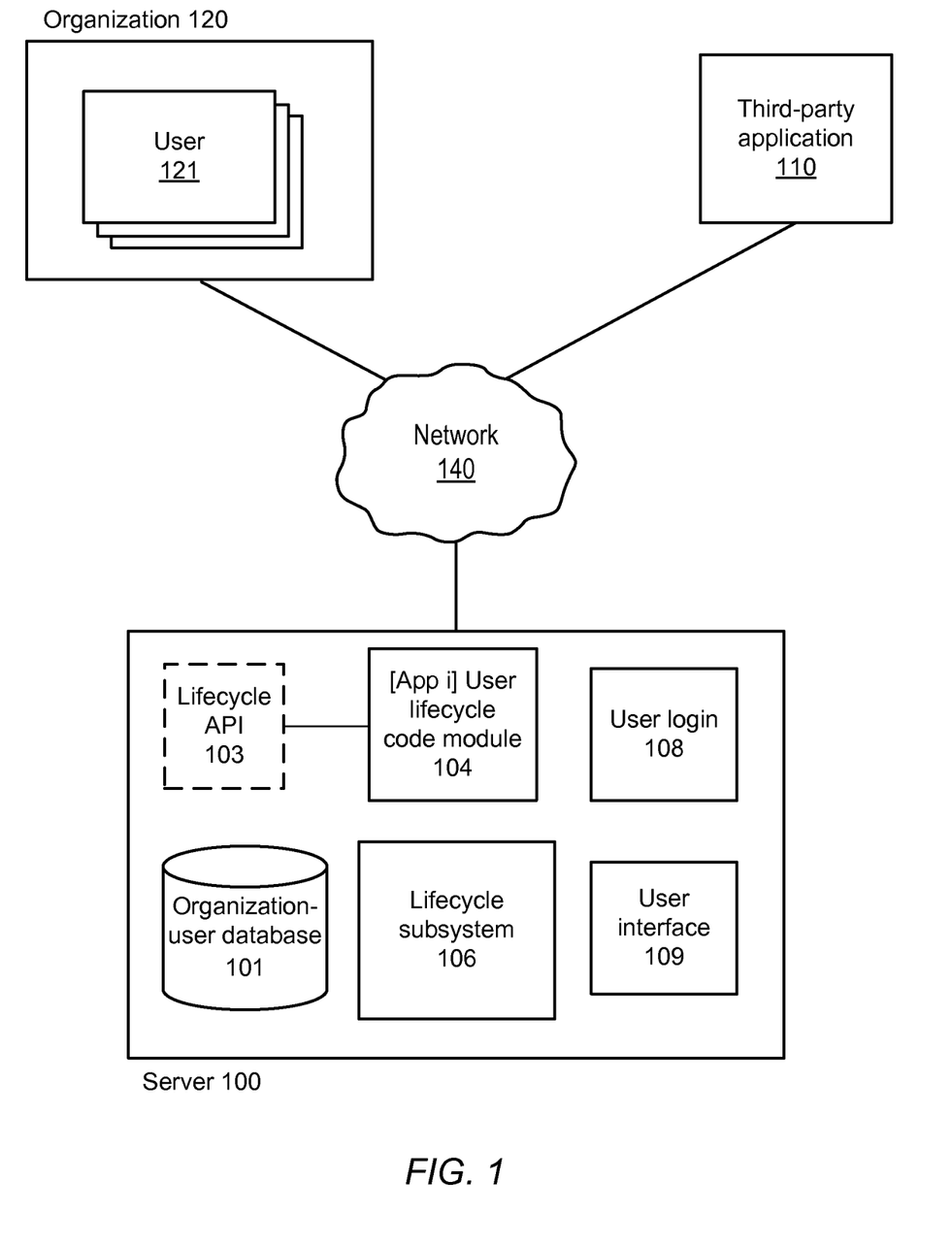
FIG. 1 illustrates one embodiment of a computing environment in which users of an organization use third-party applications available to that organization, and in which a server provides support to the organization when interacting with and managing the applications, according to one embodiment.

FIG. 1 illustrates one embodiment of a computing environment in which users of an organization use third-party applications available to that organization, and in which a server provides support to the organization when interacting with and managing the applications, according to one embodiment.

An organization 120 (e.g., a corporation or other business) has a number of different users 121 (e.g., employees), such as administrators having enhanced privileges, or non-administrator employees with lesser privileges. Each user 121 can use various client devices (e.g., desktops, laptops, tablet computers, smart phones, or the like) to access resources of the organization 120. In particular, the client devices provide access to a number of third-party applications 110, which for reasons of organizational security require user authentication before a user can use the applications. A server 100, which may be administered by an organization other than the organization 120, provides support to the organization 120 when interacting with and managing the third-party applications 110. For example, the server 100 may provide services such as single sign-on, in which a user of the organization signs in to the server 100, and the server 100 handles authentication of the user on all of the third-party applications 110 to which the user has access.

The organization 120 is an entity, such as a corporation, a school, a governmental department, or the like. Physically, the organization 120 is made up of a number of computing systems, including the client devices of the users 121; one or more internal networks that connects the computing systems, including routers or other networking devices that define the boundary between the organization and external networks; and the like.

Similarly, the server 100, although depicted as a single logical system in FIG. 1, may be implemented using a number of distinct physical systems and the connections between them, such as application servers, database servers, load-balancing servers, routers, and the like.

The third-party applications 110 may be created by different application developers. The third-party applications 110 available to a particular organization 120 could include, for example, SALESFORCE, MICROSOFT OFFICE 365, GOOGLE APPS, CISCO WEBEX, AMAZON WEB SERVICES, and the like. The third-party applications 110 are typically hosted entirely or partially on a server(s) located at a remote location from the organization 120 and made available via a network 140, such as the Internet. In one embodiment, the third-party application's user interface is implemented in HTML or other web-based technology and is rendered within embedded browsers of the client devices of the users, or within a custom application installed on the client devices. Although the term "third-party application" is used herein since for the typical organization 120 the majority of applications that a user uses are authored by different organizations, it is appreciated that the "third-party applications" could also include applications created and/or hosted by the organization 120 itself.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

As a specific example described throughout the remainder of this specification, the server 100 provides support to the organization 120 when the users of the organization undergo some form of status change with respect to the organization or otherwise undergo some change affecting their use of the various third-party applications 110 to which they have access. In order to provide support to the organization 120 in response to these changes—hereinafter referred to as "user lifecycle events"—the server 100 uses a number of components, which are now described in more detail.

In one embodiment, the server 100 has a user login module 108 that it uses to enable a user 121 to login to the server 100 (e.g., using username/password or other form of credentials), thereby establishing the identity of the user and (based on the identity of the user) the organization to which the user belongs. In one embodiment, the server 100 also has a user interface module 109 that provides a web-based graphical user interface that the user 121 uses to simplify interaction with the user's third-party applications 110, such as specifying a change of the user's profile information that is to be reflected across all of the user's applications at once. User lifecycle events triggered by the user when using user interfaces provided the user interface module 109 occur in the context of known user and organization identities, as established by the user login module 108. Thus, the server 100 can identify the user and organization associated with user lifecycle events.

The server 100 has an organization-user database 101 that describes properties of the different organizations 120 to which the server 100 provides support, as well as properties of the users of those organizations. For example, in one embodiment, the database 101 stores at least, for each organization 120, the name of the organization, a list of unique user identifiers for the users 121 of the organization, and unique identifiers of various third-party applications 110 to which the organization—or sub-groups within the organization—provides access. Similarly, the database 101 stores at least, for each user 121 of the organization 120, one or more indicators of the third-party applications 110 to which that user has access. The indicators may be direct indicators of the third-party applications 110 (e.g., a unique identifier), and/or indirect indicators, such as identifiers of organization groups to which the user belongs, where the database 101 further stores identifiers of the third-party applications to which the organization groups have access.

The server 100 further defines a user lifecycle API 103 that includes functions used by the third-party applications 110 to respond to the possible lifecycle events that could take place for a given user of an organization. The user lifecycle API 103 applies to any of the various organizations 120 that use the services of the server 100, rather than to a single one of the applications, for example. In one embodiment, the user lifecycle API 103 is implemented as an interface in a programming language such as JAVA. In one embodiment, the user lifecycle API 103 defines at least the following functions:

UserAdd: Called in response to a user joining an organization (e.g., when the user is hired). The implementation for an application should create a new account for the user within the application. Function parameters include a unique user ID for the new user account.

UserPasswordChange: Called in response to a user's password being changed (e.g., in response a scheduled password change, such as a password automatically changed at regular intervals). The implementation for an application should change the user's password within the application. Function parameters include the new password.

UserProfileChange: Called in response to a user's profile being changed, such as changing the user's name. The implementation for an application should update user data within the application, if appropriate, e.g., if the application uses the given user data. Function parameters include an identifier of the type of data changed (e.g., user name, user profile picture, etc.), and the new value of the changed data (e.g., a user name string, user profile picture image data).

UserRemove: Called in response to a user leaving an organization (e.g., when a user quits or is fired). The implementation for an application should remove and/or disable the application account for that user. Function parameters include a unique user ID for the user leaving the organization.

UserStatusChange: Called in response to a change in the user's status within an organization (e.g., when a temporary employee such as a contractor leaves the organization, possibly only temporarily). The implementation for the application should set the user's status to a given value, such as "active" (e.g., when reinstating the example contractor returns), "deactivated" (e.g., when the contractor leaves), "suspended", or the like, and to make any changes to the state of the user's account to achieve the given status (e.g., changing account values so as to deactivate the account). Function parameters include a unique user ID, and the status to which to set the user's account.

UserExists: Called in response to any operation that may need to determine whether a given user already exists in a given application. The implementation for an application should return whether the given user exists in the application. Function parameters include a unique user ID for the user to be checked.

GroupAdd: Called in response to a new group being created in an organization, for applications that support the notion of user groups. The implementation for an application should create the new group within the application. Function parameters include a unique group ID for the group to be created.

GroupRemove: Called in response to a group being deleted in an organization, for applications that support the notion of user groups. The implementation for an application should delete the group within the application. Function parameters include a unique group ID for the group to be deleted.

GroupAddMember: Called in response to a user being added to a group of an organization, for applications that support the notion of user groups. The implementation for an application should add a user to the given group within the application. Function parameters include a unique group ID for the group and for the user to be added to that group.

GroupRemoveMember: Called in response to a user being deleted from a group of an organization, for applications that support the notion of user groups. The implementation for an application should deleted a user to the given group within the application. Function parameters include a unique group ID for the group and for the user to be deleted from that group.

It is appreciated that the above API is for purpose of example, that different APIs could be defined in different embodiments, and that different APIs could be made available by the same server 100. The events are embodied as function calls, and the event data is embodied as arguments provided to the function calls. For example, the UserJoin event might be embodied as a method "void UserJoin(String newUserID)", where newUserID is the event data corresponding to the event.

The server 100 further stores a set of user lifecycle code modules 104 that specify programmatic responses to the various user lifecycle events defined by the user lifecycle API 103. Each user lifecycle code module 104 corresponds to a particular third-party application 110; thus, each module 104 specifies the particular way to implement responses to a particular user lifecycle event for a particular third-party application, thereby integrating the third-party application 110 into the user lifecycle framework defined by the server 100. Thus, for example, a user lifecycle code module 104 corresponding to the SALESFORCE application would typically take different actions to implement a "new user" event than would a user lifecycle module corresponding to the MICROSOFT OFFICE 365 application, e.g., due to the different APIs of the different applications. Any organization may create the user lifecycle code module(s) 104 for a particular third-party application 110, although in many or most cases the developer of the third-party application will also develop the corresponding user lifecycle code module (s).

In some embodiments, there may be different, separate versions of the user lifecycle code module 104 for a given third-party application 110. This permits, for example, associating the majority of users for a given organization with a stable, well-tested version of a user lifecycle code module 104 for a particular third-party application 110, and a small subset of the users with a newer version of the user lifecycle code module 104 that requires further testing before it is made available to users as a whole. Similarly, it permits allowing users of different organizations, or different divisions of a single organization, to use different versions of a third-party application 110.

The server has a lifecycle subsystem 106 that provides the user lifecycle event functionality, such as receiving and verifying new user lifecycle code modules 104, and using existing code modules to respond to new user lifecycle events triggered by the users 121 or other portions of the server 100. One embodiment of the lifecycle subsystem 106 is now described in more detail with respect to FIG. 2.

Figure 2:
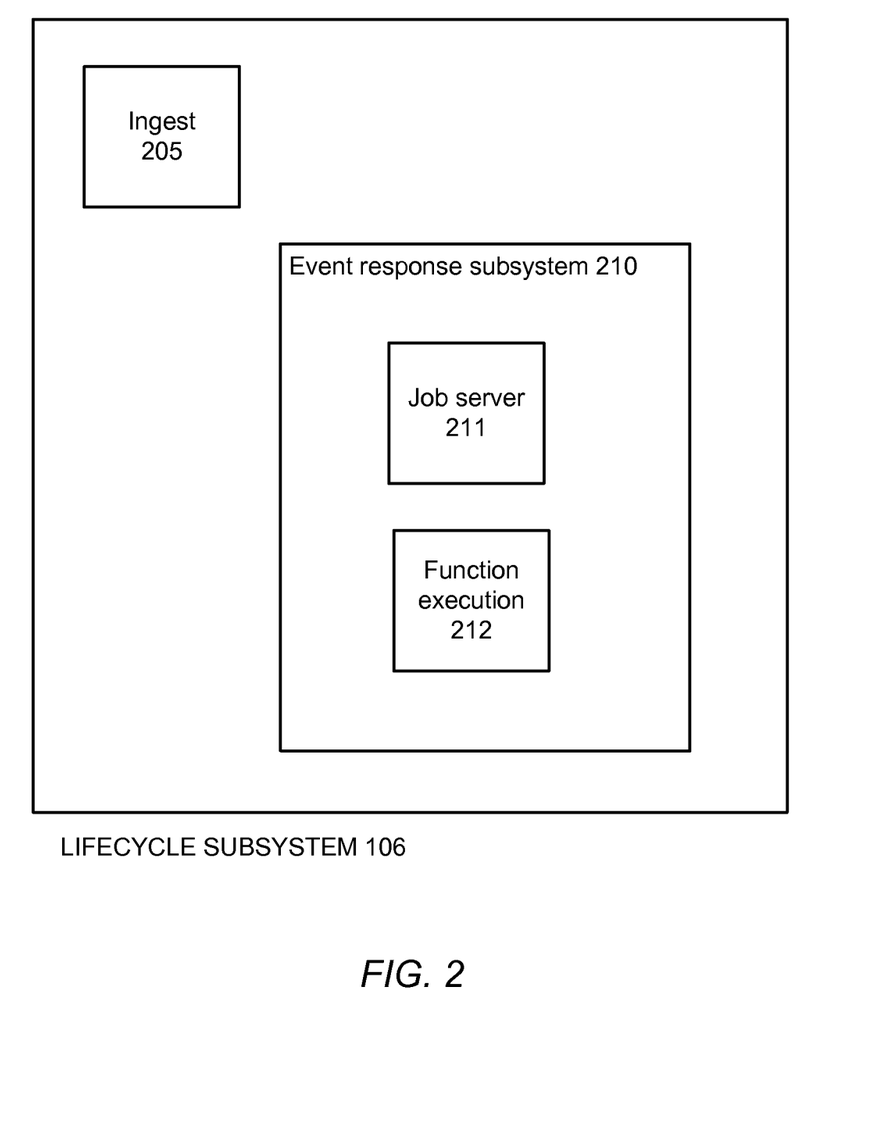
FIG. 2 illustrates the sub-components of the lifecycle subsystem of FIG. 1 in more detail, according to one embodiment.

FIG. 2 illustrates the sub-components of the lifecycle subsystem 106 in more detail, according to one embodiment.

The lifecycle subsystem 106 has an ingest module 205 that receives user lifecycle code modules 104, processes them, and stores them internally within the server 100. For example, the organization that created a particular third-party application 110 might create a user lifecycle code module 104 that specifies how to use the third-party application 110 to respond to the various possible user lifecycle event functions defined by the lifecycle API 103.

In one embodiment, the ingest module 205 precompiles the code of the user lifecycle code module 104, thereby verifying that the code module 104 properly implements the lifecycle API (e.g., that all the required functions are defined, that the proper arguments are provided, and that the proper return types are specified). With the code module 104 verified, the ingest module 205 stores the compiled version of the code module 104 for later use, along with any identifying metadata, such as an ID of third-party application 110 to which the code module 104 corresponds, the version of the code module 104 (or other conditions for the use of that particular code module, such as the organizational group affiliation of the user with whom a user lifecycle event is associated), and the like.

The lifecycle subsystem 106 has an event response subsystem 210 that takes the appropriate actions in response to the occurrence of a user lifecycle event (such as a user joining an organization).

The lifecycle subsystem 210 includes a job server module 211 that maps a user lifecycle event to one or more function calls of the user lifecycle API 103 that respond appropriately to the user lifecycle event, obtains the contextual information required by the functions, and schedules the functions for execution. The job server module 211 first identifies the organization and the user associated with the event, e.g., based on the contextual information about the current user and organization obtained by the user login module 108 of FIG. 1.

As an example of mapping a user lifecycle event to a function call of the user lifecycle API 103, for the user lifecycle event is a new user joining the organization, the job server module 211 might map the event to the UserAdd function of the user lifecycle API 103, to be called for the core applications 110 that the organization-user database 101 indicates should be available to all users. As another example, if the user lifecycle event is an existing user being added to a new group, the job server module 211 might map the event to the UserAdd function, to be called for the applications 110 to which the organization-user database 101 indicates users of the new group should have access, and to which the user does not already have access. As another example, if the user lifecycle event is the granting of access of a user to a specific application 110, the job server module 211 might map the event to the UserAdd function, to be called only for that specific application 110.

The job server module 211 also identifies the third-party applications 110 that are affected by the user lifecycle event. For example, a change of a user's group affiliations to include an additional group would affect the user's relationship with the third-party applications 110 assigned to that group by causing the user to have access to the applications (if the user didn't already have access); in one embodiment, this involves reading the data for the group in the data of the organization-user database 101 for the organization associated with the user lifecycle event to identify the applications 110 assigned to the group and already assigned to the user 121.

The job server 211 also identifies the proper user lifecycle code modules 104 to use when calling the function, and the manner in which the code modules should be used (e.g., their security constraints). For example, the particular user lifecycle code modules 104 to use are determined at least in part based on the identified third-party applications 110 that are affected by the lifecycle event. Particular versions of the user lifecycle code modules 104 may further be identified based on other factors, such as the user associated with the user lifecycle event (e.g., if particular sets of users are assigned particular versions, such as one version for a testing set and another version for a main group). Metadata of the identified user lifecycle code modules 104 may specify the manner in which they should be used, such as the security credentials to use when calling the function corresponding to the user lifecycle event.

In one embodiment, the job server 211 also identifies the parameter values to provide as input to the API function corresponding to the user lifecycle event. For example, for the event of a user joining an organization, the job server 211 could determine by examining the user lifecycle API 103 that a "user ID" parameter is required for the UserAdd function, and that its value is the username of the user associated with the user lifecycle event.

The job server 211 encodes the function data in a data structure, e.g., specified in JavaScript Object Notation (JSON), that it passes to a function execution module 212. The function data includes an identifier of the user lifecycle code module 104 to use, the name of the function to call within the user lifecycle code module, and values of the parameters to the function. In one embodiment, the job server 211 encodes the data for all of the different affected third-party applications 110 in a single data structure. One example data structure specified in JSON for checking whether a particular user already exists in an application (e.g., the "UserExists" function referred to above) is provided in Appendix A, below.

The function execution module 212 executes the request corresponding to the function data provided by the identified user lifecycle code modules 104. In one embodiment, the modules 104 are executed so as to isolate them from the rest of the system in order to improve system security. For example, in one embodiment the function execution module 212 instantiates and executes a lightweight virtualization/sandboxing container, such as that provided by the DOCKER project, that isolates a process from other processes executing on the operating system. In one embodiment, in order to provide additional security, the user lifecycle code modules 104 identified for the user lifecycle event are further run within a virtual machine (e.g., a JAVA virtual machine) executed within the container. In any case, regardless of the particular implementation, the appropriate function of the user lifecycle code modules 104 is executed. In one embodiment, the function execution module 212 reads the function arguments from the encoded function data and executes the function with the function arguments as the provided input. In one embodiment, each user lifecycle code module 104 is run within a separate container.

The execution of the appropriate function of the user lifecycle code modules 104 results in calls being made to the third-party applications 110 corresponding to the executed user lifecycle code modules 104, the calls specified using the APIs of the third-party applications. For example, a call to an "add user" function for a first third-party application might make a call to the IP address of a server of the first third-party application, passing it data specifying the name that the first third-party application uses internally to designate a request to add a user, along with the proposed user ID of the new user; a call to the "add user" function for a second, different third-party application might make a call to the IP address of a server of the second third-party application, passing it data specifying the name that the second third-party application uses internally to designate a request to add a user, along with the proposed user ID of the new user, and (perhaps) other different types of arguments that second third-party application API calls for when adding a new user.

When the function execution module 212 receives return value data from the third-party applications 110 in response to the calls made to the third-party applications, the function execution module provides the return value data to the job server 211 and deletes any containers that it set up to execute the requests.

Figure 3:
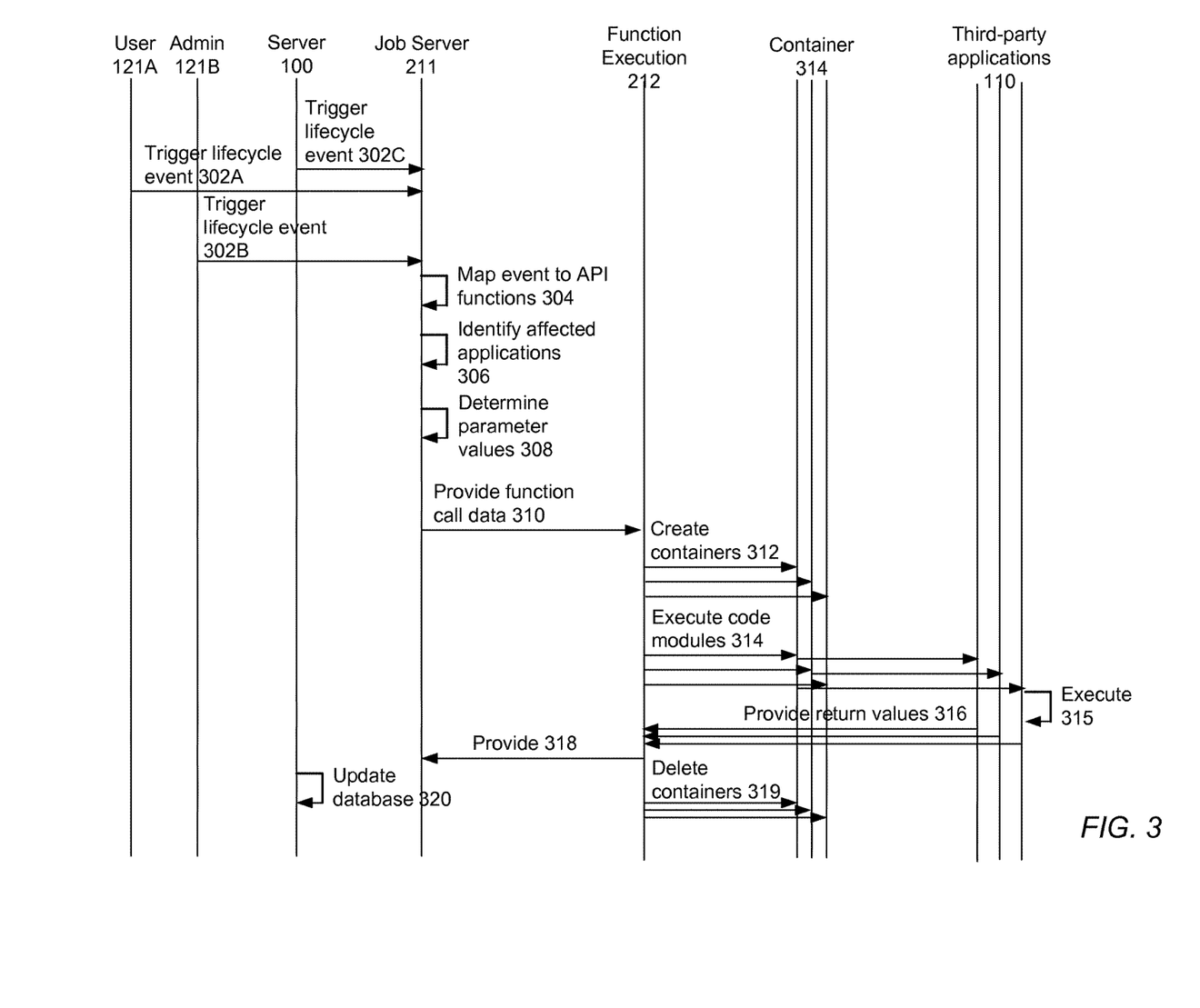
FIG. 3 illustrates the interactions that take place between different entities of FIGS. 1 and 2 when responding to a user lifecycle event, according to one embodiment.

FIG. 3 illustrates the interactions that take place between different entities of FIGS. 1 and 2 when responding to a user lifecycle event, according to one embodiment.

In a first step 302, a user lifecycle event is triggered. For example, the lifecycle event could be triggered directly by a user 121A that is the user with whom the event is associated, such as a user triggering a "UserProfileChange" event by changing part of the user's organization profile, such as the user's name. As another example, the user lifecycle event could be trigged by a user 121B that is an administrator of the organization, such as the administrator adding the user, or the administrator changing the user's profile or group affiliations. As another example, the user lifecycle event could be initiated by the server 100 itself, e.g., by the server changing the passwords of all the users for all the users' applications 110 in response to a password rotation policy evaluated by the server.

As discussed in more detail above with respect to FIG. 2, the job server 211 maps 304 the user lifecycle event to one or more function calls of the user lifecycle API 103 and identifies 306 the third-party applications 110 that are affected by the user lifecycle event. The job server 211 also identifies 308 the proper user lifecycle code modules 104 to use when calling the API function(s) for the different affected third-party applications, such as selecting the proper versions of the modules 104. The job server 211 further determines 308 any parameter values to be provided as input to the API functions. The job server 211 provides 310 the data relevant to the calls, e.g., as a JSON data structure, to the function execution module 212.

The function execution module 212 creates one or more application containers for execution of the API functions in the user lifecycle code modules 104. In one embodiment, the function execution module 212 creates one container for each separate user lifecycle code module 104. The function execution module 212 executes 314 the code modules by invoking the function corresponding to the user lifecycle event (e.g., the UserAdd function) within the code modules 104. Execution of the function in a particular user lifecycle code module 104 causes the function to make an API call to the third-party application 110 corresponding to that user lifecycle code module.

The third-party applications 110 accordingly execute 315 the API call. Execution of the API call typically makes a change to the data of the user in the third-party application. For example, in the case of a UserAdd function, the corresponding API call to a third-party application 110 creates account data for the user on the third-party application. Similarly, in the case of a UserPasswordChange function, the corresponding API call to a third-party application 110 changes the password data of the user on the third-party application. After execution of the API call, the third-party applications 110 provide 316 resulting return values back to the function execution module 212, which in turn provides 318 the return values back to the server 100 and deletes 319 the contains that it created at step 312. The server 100 then updates 320 the organization-user database 101 based on the return values. For example, in the case of a "UserAdd" function, a return value with the Boolean "true" value (indicating successful creation of a new user account) would cause the server 100 to update the organization-user database 101 to reflect the fact that the given organization has the given new user.

Figure 4:
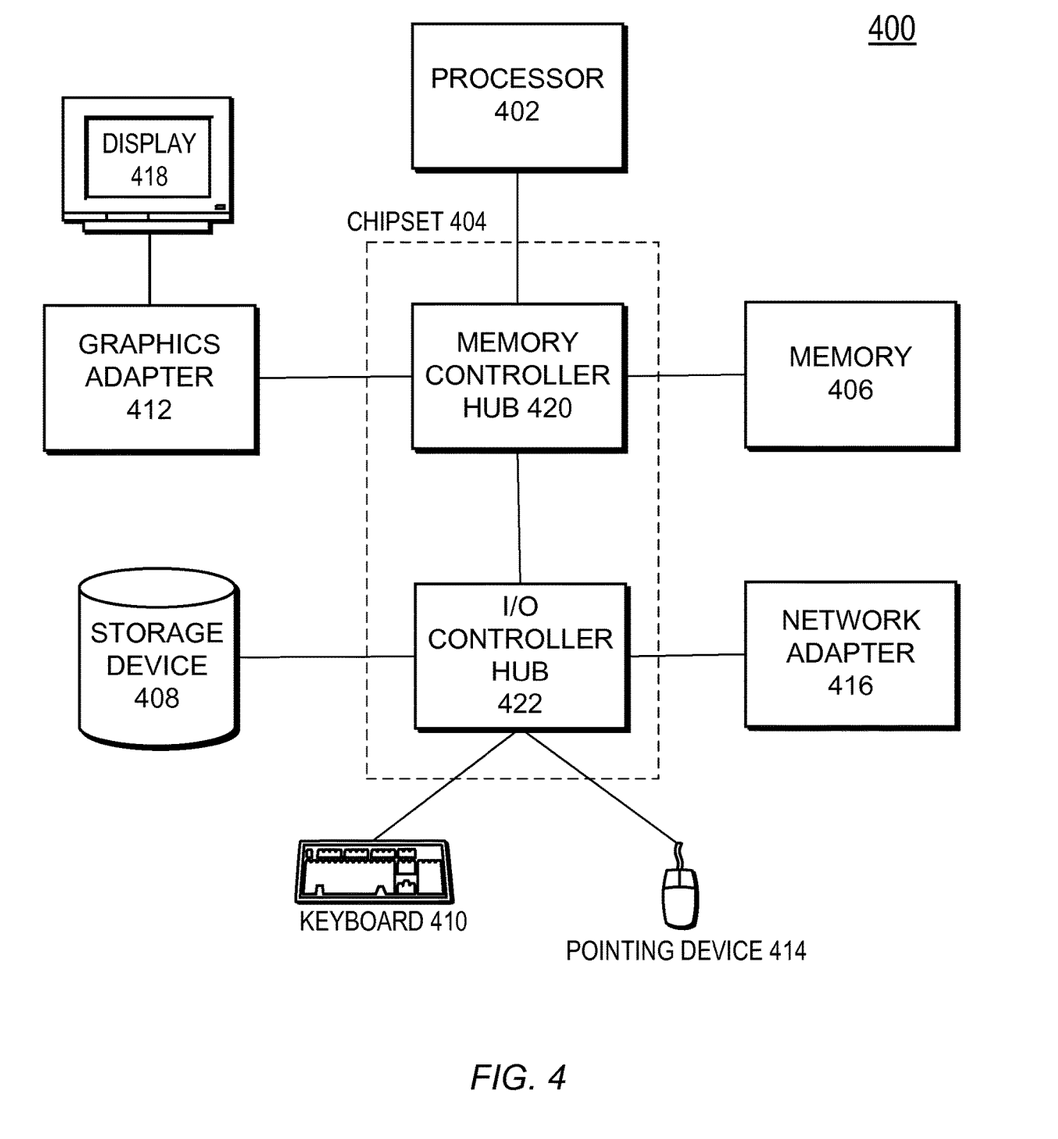
FIG. 4 is a high-level block diagram illustrating physical components of a computer 400 used as part or all of the server, organization, or system providing the third-party application, according to one embodiment.

FIG. 4 is a high-level block diagram illustrating physical components of a computer 400 used as part or all of the server 100, organization 120, or system providing the third-party application 110, according to one embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400 acting as a server may lack a graphics adapter 412, and/or display 418, as well as a keyboard or pointing device. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

APPENDIX A

Appendix A provides a listing in JSON for a data structure encoding a request to determine whether a given user exists in a given application (e.g., for the "UserExists" function referenced above). The value for the "userIdFieldValues" key specifies an email address that uniquely identifies the user.

```
{
    "limits": {
        "maxRequestCount": 1000
    },
    "manifest": {
        "app": "com.okta.apps.cpc.slack.SlackCpcImpl",
        "auth": [
            {
                "headerValuePropertyDescription": "API Token to use for your Slack team. (ex: slack-122323-232323-232323232-2323232)",
                "headerValuePropertyTitle": "Slack API token",
                "type": "header"
            }
        ],
        "capabilities": [
            "import",
            "push_new_users",
            "push_pending_users",
            "push_profile_update",
            "deprovisioning"
        ],
        "cpc_version": "1",
```

-continued

```
        "manifest_version": "1",
        "name": "Slack",
        "script_type": "java",
        "unique_field_name": "email",
        "urls": [
            "https://api.slack.com"
        ],
        "version": "0.9"
    },
    "message": {
        "appInstanceProperties": {
            "domain": "okta"
        },
        "auth": {
            "type": "HEADER",
            "value": "xoxp-2318992071-2318992075-2991387696-96813d"
        },
        "data": {
            "userIdFieldName": "email",
            "userIdFieldValues": [
                "rcollins@yourcompany.com"
            ]
        },
        "schema": { }
    },
    "requestContext": {
        "appInstanceId": "0oa1anj0EvKK8CRyz0g5",
        "method": "checkUserExists",
        "org": "00ogowQjgW81ZSk4Q0g3"
    }
}
```

What is claimed is:

1. A computer-implemented method of a server, the method comprising:
    storing a user lifecycle application programming interface (API) that declares but does not define a plurality of user lifecycle functions for accessing data of users of third-party applications, the user lifecycle API implemented as an interface of a programming language;
    storing a plurality of lifecycle code modules corresponding to the plurality of third-party applications and including code providing third-party application-specific implementations of each of the user lifecycle functions of the interface, each of the third-party applications having a corresponding lifecycle code module, the code of a first one of the lifecycle code modules differing from the code of a second, different one of the lifecycle code modules;
    identifying an occurrence of a user lifecycle event;
    identifying a first user of an organization associated with the user lifecycle event;
    mapping the user lifecycle event to a function of the user lifecycle API associated with the user lifecycle event;
    identifying, as a subset of the third-party applications, third-party applications to which the organization has granted the first user access; and
    for each third-party application of the identified subset:
        identifying the lifecycle code module corresponding to the third-party application, and
        calling code of the identified lifecycle code module that implements the mapped function, thereby making a change to data of the user in the third-party application, the data of the user in the third-party application being stored in a database of the third-party application that is remote from the server.

2. The computer-implemented method of claim 1, wherein the lifecycle code modules are received from a plurality of application creators that created the plurality of third-party applications.

3. The computer-implemented method of claim 1, wherein the user lifecycle event is triggered by a request of an administrator of the organization.

4. The computer-implemented method of claim 1, wherein the user lifecycle event is triggered by a user password rotation policy evaluated by the server.

5. The computer-implemented method of claim 1, wherein the user lifecycle event is initiated by the server.

6. The computer-implemented method of claim 1, wherein the server identifies the user and the organization based on a prior login of the user into a user interface corresponding to the organization.

7. The computer-implemented method of claim 1, further comprising:
   identifying an occurrence of a second user lifecycle event associated with a second user different from the first user;
   for a first application of the identified subset, calling a function of a second lifecycle code module corresponding to the first application, the second lifecycle code module being different from a first lifecycle code module for which the function was called for the first application and for the first user.

8. The computer-implemented method of claim 1, wherein calling the function comprises instantiating a virtualization container and executing the identified lifecycle code module within the virtualization container.

9. The computer-implemented method of claim 1, wherein calling a function of a user lifecycle code module comprises making an API call to a remote third-party application corresponding to the user lifecycle code module.

10. The computer-implemented method of claim 1, wherein the user lifecycle event is an addition of the first user, and the function is determining whether the first user already exists in the third-party applications.

11. The computer-implemented method of claim 1, wherein storing a plurality of lifecycle code modules further comprises:
   for each lifecycle code module:
      compiling the code;
      responsive to compiling the code, verifying the code module implements the user lifecycle API; and
      storing, along with the lifecycle code module, associated identifying metadata of the lifecycle code module.

12. The computer-implemented method of claim 1, further comprising:
   identifying a first group of the organization with which the user is affiliated;
   identifying first applications to which users of the first group have access;
   allowing the user to access the first applications;
   determining that the user has changed group membership from the first group to a second group of the organization;
   identifying second applications to which users of the second group have access; and
   denying the user access to a first one of the first applications, responsive to the user changing to the second group.

13. A computer-implemented method of a server, the method comprising:
   storing a user lifecycle application programming interface (API) that declares a plurality of user lifecycle functions for accessing data of users of third-party applications, the user lifecycle API being an interface of a programming language;
   accessing a plurality of lifecycle code modules corresponding to the plurality of third-party applications, the lifecycle code modules implementing the user lifecycle functions, wherein code of a first one of the lifecycle code modules differs from code of a second, different one of the lifecycle code modules;
   identifying an occurrence of a user lifecycle event associated with a first user and an organization;
   mapping the user lifecycle event to a function of the user lifecycle API associated with the user lifecycle event; and
   for each third-party application of a plurality of the third-party applications:
   identifying a lifecycle code module corresponding to the third-party application, and
   calling code of the identified lifecycle code module that implements the mapped function, thereby making a change to data of the user in the third-party application.

14. The computer-implemented method of claim 13, wherein the lifecycle code modules are received from a plurality of application creators that created the plurality of third-party applications.

15. The computer-implemented method of claim 13, wherein the user lifecycle event is triggered by a user password rotation policy evaluated by the server.

16. The computer-implemented method of claim 13, wherein the server identifies the user and the organization based on a prior login of the user into a user interface corresponding to the organization.

17. The computer-implemented method of claim 13, further comprising:
   identifying an occurrence of a second user lifecycle event associated with a second user different from the user;
   for a first application of the plurality of third-party applications, calling a function of a second lifecycle code module corresponding to the first application, the second lifecycle code module being different from a first lifecycle code module for which the function was called for the first application and for the first user.

18. The computer-implemented method of claim 13, wherein calling the function comprises instantiating a virtualization container and executing the identified lifecycle code module within the virtualization container.

19. The computer-implemented method of claim 13, wherein calling a function of a user lifecycle code module comprises making an API call to a remote third-party application corresponding to the user lifecycle code module.

20. The computer-implemented method of claim 13, wherein the API includes: a function to add a new user to a third-party application, a function to remove a user from the third-party application, and a function to change a status of a user in the third-party application.

* * * * *